Oct. 2, 1956
A. R. STAHL
2,764,958
LIQUID DISPENSING DEVICE FOR CYCLICALLY
OPERATING APPLICATORS
Filed Oct. 23, 1953
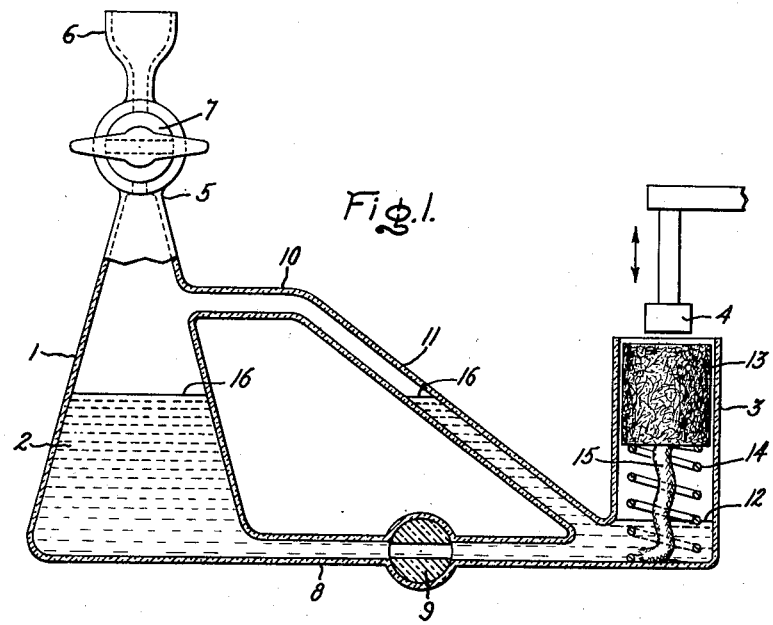
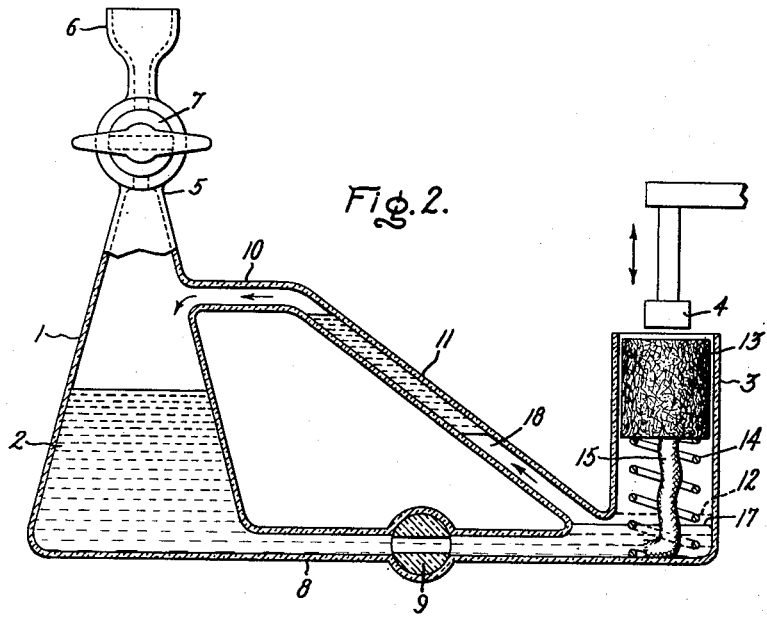
Inventor:
Alfred R. Stahl,
by Nathan Klomfield
His Attorney.

United States Patent Office 2,764,958
Patented Oct. 2, 1956

2,764,958

LIQUID DISPENSING DEVICE FOR CYCLICALLY OPERATING APPLICATORS

Alfred R. Stahl, Garnet Lake, N. Y., assignor to General Electric Company, a corporation of New York Application October 23, 1953, Serial No. 387,956

2 Claims. (Cl. 118—243)

My invention relates to liquid dispensing devices and pertains more particularly to novel liquid dispensing devices including a novel arrangement for maintaining a constant liquid level.

In some constructions such as automatic production machinery, it is desirable to provide devices for dispensing liquid cyclically and in substantially equal amounts. In such devices it is often also desirable to provide an arrangement for maintaining a constant liquid level within close limits in order to insure that the liquid will be dispensed in substantially equal amounts.

A primary object of my invention is to provide a new and improved liquid dispensing device.

Another object of my invention is to provide in a liquid dispensing device a new and improved level arrangement for liquids.

Another object of my invention is to provide a new and improved constant level arrangement for liquids which is capable of maintaining liquid levels within close limits.

Another object of my invention is to provide a new and improved constant level arrangement for liquids which is atmospherically controlled.

Another object of my invention is to provide a liquid dispensing device including a constant level arrangement for liquids which is simple in construction, inexpensive to manufacture and in operation requires a minimum of attention on the part of an operator.

Further objects and advantages of my invention will become apparent as the following description proceeds and the features of novelty which characterize my invention will be pointed out with particularity in the claims annexed to and forming part of this specification.

In carrying out the objects of my invention, I provide an open container and a closed container adapted for holding a liquid supply. Liquid is dispensed from the open container by means of a member arranged to dip or reciprocate a predetermined extent into the open container for picking up liquid therefrom. The open container is supplied with liquid from the closed container through a tube connected between the open container and the closed container at a point below the normal level of the liquid supply. Another tube extends between a point in the open container at which a desired level is to be maintained and a point in the closed container above the liquid supply therein. Valve means are provided for opening the closed container to refill it with liquid and for stopping the flow of liquid to the open container during refilling.

For a better understanding of my invention, reference may be had to the accompanying drawing in which:

Fig. 1 is a partially sectional view of the device illustrating the liquid in the open container at the desired level; and Fig. 2 is a similar view of the device illustrating the operation of my device when the liquid in the open container stands below the desired level.

As seen in the drawing, my liquid dispensing device comprises a container 1 for holding a supply of liquid indicated at 2, another container 3 for holding liquid to be dispensed and a member designated 4 for picking up liquid from the container 3.

The container 1 includes a neck portion 5 on which is formed a funnel 6 provided for facilitating pouring of liquid into the container for refilling it or replenishing the supply 2. For reasons which will be brought out hereinafter an air-tight valve 7 is included in the neck portion 5 whereby the container 1 may be closed to the atmosphere.

The container 3 is arranged to receive liquid from the supply in the closed container 1 through a horizontal tube 8 joined to and connecting the lower portions or bottoms of the containers 1 and 3. The tube 8 desirably includes a valve 9 for closing it during refilling of the container 1. As will appear the valve 9 is provided to avoid any adverse affects on the level of the liquid in the container 3 during refilling of container 1 or when for any other purpose the valve 7 is open.

A second tube 10 also connects the containers 1 and 3 and includes an inclined portion 11. As seen in the drawing, the second tube 10 extends between a point in the first container 1 above the level of the liquid supply 2 and a point in the second container 3 at which the tube 8 and the container 3 are joined. As also seen, the lower end of the inclined portion 11 of the tube 10 is contiguous with the wall of the container 3 at a point at which a desired liquid level indicated as at 12 is to be maintained. In a manner which will be described in detail hereinafter, the tube 10 is effective for maintaining the liquid in the container 3 substantially constantly at the level 12.

By means not fully shown the member 4 is arranged to dip or reciprocate cyclically a predetermined extent or distance into the container 3. In the container 3, the member 4 touches an absorbent member 13. The absorbent member 13 is supported in the container 3 above the liquid therein by a coil spring 14. A wick 15 imbedded at one end in the absorbent member and having the other end extending into the liquid in the container 3 is effective for maintaining the absorbent member saturated. Therefore, each time the member 4 touches the absorbent member a predetermined amount of liquid from the absorbent member adheres to the member 4. Thus, liquid is dispensed from the container 3. It will be apparent that the member 4 may subsequently be moved to another operating position for picking up relatively light elements simply by touching same and having them adhere thereto through the agency of the liquid carried by the member 4.

Now it will be seen that in order to insure predetermined saturation of the absorbent member 13 and thereby to insure dispensation of the liquid in substantially equal amounts, it is necessary to provide means for maintaining the liquid in the container 3 at a level at which submersion of the end of the wick 15 will be insured. This my device does under control of the atmosphere in a manner which will now be described in detail.

When the valve 7 is open and the container 1 is being filled with liquid, the valve 9 is closed. Thus flow of liquid to the container 3 is shut off and no affect is had on the level in the container 3. Subsequently when the valve 7 is closed and the valve 9 is opened the container 1 is closed to the atmosphere and the only air that can be admitted thereto is that which can enter through the open container 3 and the tube 10. As long as the tube 10 remains open liquid from the supply 2 is permitted to flow into the container 3 through the tube 8.

In the container 3 the liquid raises to the desired level 12. At this level it closes off the tube 10 to the atmosphere thereby closing the container 1 and stopping the flow of liquid into the container 3. In the container 1 and the tube 10 the liquid levels equalize at 16 above the level 12 in the container 3 in the manner shown in Fig.

1. The flow of liquid into the container 3 stops when the liquid therein reaches the level 12 and the levels 12 and 16 are maintained owing to the state of pressure equilibrium on the various liquid surfaces. That is, further flow, which would tend to lower the air pressure in the now closed container 1, is prevented by atmospheric pressure acting on the surface of the liquid in the open container 3.

Subsequently after repeat cycles of operation of the member 4 the liquid in the container 3 stands below or deviates from the desired level 12 and for example at a lower level 17 in Fig. 2. With the liquid at the lower level 17 the tube 10 is reopened and a volume of air indicated at 18 is permitted to pass therethrough into the container 1 expelling into the container 1 some of the liquid which formerly comprised the column thereof in the tube 10. Thereafter liquid again flows to the container 3 through the tube 8 to fill the container to the desired level 12 at which the flow of liquid into the container 3 is again stopped in the above described manner. This liquid action is repeated each time the liquid level in the container 3 stands below the desired level 12. Thus a substantially constant level is maintained in the container 3 within close limits and under control of the atmosphere.

It will be understood that both the difference between the desired level 12 in Fig. 1 and the lower level 17 in Fig. 2, and the volume of air indicated at 18 in Fig. 2 will depend on the viscosity of the liquid used in the device. That is, the higher the viscosity of liquid utilized the greater will be the volume of air 18 required to raise the column of liquid in the tube 10 and the greater will be the difference between the desired level 12 and the lower level 17 before air is admitted into the container 1 through the tube 10 and liquid is caused to flow into the container 3 for raising the level therein. Additionally, it will be seen that in the described arrangement, the inclined portion 11 of the tube 10 will be effective for preventing air from being trapped in the tube 10 and for facilitating lifting of the liquid column therein.

When the level of the liquid supply 2 becomes dangerously low, or in other words when it approaches the level 12 to be maintained in the container 3, it is desirable that the container 1 be refilled. Before opening the valve 7 to admit liquid into the container 1 the valve 9 in the tube 8 is closed. Thereafter, the valve 7 may be opened and liquid poured into container 1 through the funnel 6 without affecting the desired level 12 in the container 3. After refilling the container 1 and reclosing the valve 7, the valve 9 may be reopened following which the device continues to maintain the constant liquid level in the manner described above.

It will be seen that while I have shown liquid dispensing means including an absorbent member, a wick, etc. my invention is not limited to this particular form of dispensing arrangement but can include any form of arrangement for cyclically dispensing substantially equal amounts of liquid, for instance, a reciprocating ladling arrangement could be employed for dipping into the liquid in the container 3 beneath the desired level 12 a predetermined extent thereby to pick up a predetermined amount of liquid. In such an arrangement the constant level feature of my invention will insure that a substantially equal amount of liquid will be picked up during each dipping or ladling operation.

While I have shown and described a specific embodiment of my invention, I do not desire my invention to be limited to the particular form shown and described and I intend by the appended claims to cover all modifications within the spirit and scope of my invention.

What I claim as new and desire to secure by Letters Patent of the United States is:

1. A liquid dispensing device comprising; an open container, an absorbent member, means resiliently maintaining said absorbent member in an elevated position in said open container, a wick extending from said absorbent member downwardly into said open container, a closed container for holding a supply of liquid, a tube connecting said open container and said closed container below the level of said liquid supply whereby said open container receives liquid from said supply, another tube connecting said containers between a point in said open container at which a desired liquid level is to be maintained therein to maintain the lower portion of said wick immersed and a point in said closed container above said liquid supply, said last-mentioned tube being closed by liquid and the flow of liquid into said open container being thereby prevented by atmospheric pressure acting on the liquid in said open container when said liquid is at said desired level in said open container, said last-mentioned tube admitting air into said closed container when the level of said liquid stands below said desired level in said open container whereby liquid is permitted to flow into said open container for raising the level therein to said desired level, and means for cyclically engaging said absorbent member to pick up cyclically therefrom substantially equal amounts of liquid.

2. In a liquid dispensing device, an open container, an absorbent member disposed in an elevated position in said open container, a wick extending from said absorbent member downwardly into said open container, a closed container holding a supply of liquid and disposed laterally of said open container, a horizontal first tube joined to and connecting the bottoms of said containers whereby said open container receives liquid from said supply, and a second tube connecting said open container with said closed container at a point above said supply, said second tube including an inclined portion having the lower end thereof opening into the juncture between said first tube and said open container and being contiguous with a wall of said open container at a point at which a desired liquid level is to be maintained therein, said lower end being completely closed by liquid and the flow of liquid into said open container being thereby prevented when said liquid is at said desired level, said second tube admitting air into said closed container through said lower end when liquid stands below said desired level, whereby liquid is permitted to flow into said open container through said horizontal tube for raising the level in said open container to said desired level.

References Cited in the file of this patent

UNITED STATES PATENTS

| 603,768 | Karges | May 10, 1898 |
| 1,499,833 | Lichte | July 1, 1924 |
| 1,705,845 | Woodman | Mar. 9, 1929 |
| 2,098,337 | Edwards | Nov. 9, 1937 |
| 2,361,818 | Brightwell | Oct. 31, 1944 |